US012607442B2

(12) United States Patent
Khanenya et al.

(10) Patent No.: US 12,607,442 B2
(45) Date of Patent: Apr. 21, 2026

(54) ACTIVE THERMAL MANAGEMENT FOR COORDINATE MEASURING MACHINES

(71) Applicant: HEXAGON TECHNOLOGY CENTER GMBH, Heerbrugg (CH)

(72) Inventors: Nikolay Khanenya, St. Gallen (CH); Danick Brühlmann, Staad (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 364 days.

(21) Appl. No.: 18/223,461

(22) Filed: Jul. 18, 2023

(65) Prior Publication Data

US 2024/0019237 A1     Jan. 18, 2024

(30) Foreign Application Priority Data

Jul. 18, 2022     (EP) ..................................... 22185501

(51) Int. Cl.
*G01B 5/008*          (2006.01)
*G05D 23/19*          (2006.01)

(52) U.S. Cl.
CPC ......... *G01B 5/008* (2013.01); *G05D 23/1917* (2013.01)

(58) Field of Classification Search
CPC ...................................................... G01B 5/008
USPC .......................................................... 33/503
See application file for complete search history.

(56) References Cited

U.S. PATENT DOCUMENTS

| | | | |
|---|---|---|---|
| 7,861,430 B2 | 1/2011 | Jonas et al. | |
| 10,914,581 B2 * | 2/2021 | Atherton ................ | G01B 5/008 |
| 11,045,944 B2 * | 6/2021 | Phipps ................. | G01B 21/045 |
| 12,257,707 B2 * | 3/2025 | Jonas ..................... | B25J 9/0084 |
| 2005/0166413 A1 | 8/2005 | Crampton | |
| 2011/0061253 A1 | 3/2011 | Jonas et al. | |
| 2012/0320943 A1 | 12/2012 | Cramer et al. | |
| 2020/0049477 A1 | 2/2020 | Lankalapalli et al. | |
| 2020/0230802 A1 | 7/2020 | Phipps | |
| 2024/0401925 A1 * | 12/2024 | Brühlmann ............ | G01B 5/012 |
| 2025/0164229 A1 * | 5/2025 | Khanenya ............ | G01B 21/047 |

FOREIGN PATENT DOCUMENTS

DE     11 2012 002 486 B4     10/2015

OTHER PUBLICATIONS

Extended European Search Report dated Dec. 16, 2022 as received in Application No. 22185501.8.

* cited by examiner

*Primary Examiner* — George B Bennett
(74) *Attorney, Agent, or Firm* — Maschoff Brennan

(57) ABSTRACT

A coordinate measuring machine (CMM) for determining at least one spatial coordinate of a measurement point on an object, the CMM comprising a structure comprising a base and a plurality of frame elements, wherein a probe head is attached to one of the frame elements and movable relative to the base, wherein the CMM comprises a temperature control system configured to control a temperature of a plurality of frame elements of the structure and comprising a control unit, one or more temperature sensors, and one or more heating elements, wherein the control unit is configured to control the heating elements based on the temperature values received from the temperature sensors.

15 Claims, 5 Drawing Sheets

ACTIVE THERMAL MANAGEMENT FOR COORDINATE MEASURING MACHINES

BACKGROUND

The present disclosure generally pertains to a coordinate measuring machine (CMM) and to a method for measuring coordinates with a CMM. More particularly, the disclosure pertains to thermal management system and method for actively controlling a temperature of the CMM or parts thereof. According to embodiments of the CMM, this is achieved by constantly raising the temperature of structural elements of the CMM above ambient temperatures of a surrounding.

Coordinate measuring devices, such as stationary coordinate measuring machines (CMM) or portable articulated arm coordinate measuring machines (AACMM) or laser-based coordinate measuring devices including laser trackers, laser scanners and total stations are used in a wide variety of applications in quality management and quality assurance. Preferably, in order to allow highly precise coordinate measurements, a temperature of the respective device should be known, and preferably should be as constant and uniform as possible. Therefore, stationary CMMs are often operated in environments having known and constant ambient temperatures so that they typically may rely on an external ambient temperature stabilization system. Disadvantageously, this solution requires specially prepared spaces, e.g. metrological laboratories, with energy-consuming air conditioning being installed and constantly running Consequently, this solution cannot be used outdoors and disadvantageously is not practicable for using coordinate measuring devices, such as portable or handheld CMMs, in unconditioned surroundings. It would be desirable to provide a CMM that can be used at different ambient temperatures and under changing ambient temperatures with high measurement precision.

Some coordinate measuring devices comprise temperature stabilization systems that are intended to cool the devices below the ambient temperature. However, these systems require refrigerating elements and liquid coolant circuits or passive heat conductors which are expensive, sensitive and/or generally difficult to handle. It would be desirable to provide a coordinate measuring device that keeps a constant temperature and can be build and maintained with less expenditure and reduced weight.

DE 11 2012 002 486 B4 discloses a warming-up procedure for a laser tracker using its internal electric components. U.S. Pat. No. 7,861,430 B2 discloses a CMM comprising an active heating for an articulating probe head of the CMM.

SUMMARY

It would be desirable to provide a functionality that allows keeping a temperature within a CMM, or at least the most important parts thereof, at a known, constant and uniform value throughout a measurement process independent of ambient temperatures.

It is therefore an object of the present disclosure to provide an improved CMM having a constant, particularly high, measurement precision independent of ambient temperatures.

It is a further object of the present disclosure to provide such a CMM having an active temperature control functionality.

It is a further object of the present disclosure to provide such a CMM, wherein the CMM can be portable, handheld and/or battery-operated.

It is a further object of the present disclosure to provide such a portable, handheld and/or battery-operated CMM, wherein the CMM is lightweight and the temperature control functionality is energy-efficient.

At least one of these objects is achieved by the embodiments described herein.

A first aspect pertains to a CMM for determining at least one spatial coordinate of a measurement point on an object, the CMM comprising a structure comprising a base and a plurality of frame elements, wherein a probe head is attached to one of the frame elements and movable relative to the base. A temperature control system of the CMM is configured to control a temperature of a plurality of frame element of the structure and comprises a control unit, one or more temperature sensors and one or more heating elements. The temperature sensors are configured to generate temperature values and to transmit the temperature values to the control unit, and the control unit is configured to receive the temperature values and to control the heating elements based on the received temperature values.

According to some embodiments of the CMM, the control unit is configured to control the heating elements in such a way that the temperature of a first frame element of the structure remains constant, e.g. at least over a time period that lasts at least as long as a single measurement of a measurement point by the CMM.

According to some embodiments of the CMM, the control unit is configured to control the heating elements in such a way that the temperature of the first frame element exceeds an ambient temperature of a surrounding of the machine.

In one embodiment, the control unit is configured to control the heating elements in such a way that the temperature of the first frame element meets a pre-defined temperature that exceeds the ambient temperature.

In another embodiment, the temperature control system comprises at least one temperature sensor that is configured to measure the ambient temperature.

According to some embodiments, the CMM comprises one or more covers, wherein each cover encloses at least partially one or more of the frame elements and is configured to provide passive thermal insulation to reduce thermal exchange between the one or more enclosed frame elements and a surrounding of the machine. For instance, at least one heating element may be at least partly provided inside one of the covers.

According to some embodiments of the CMM, the structure comprises a plurality of links and a plurality of joints as frame elements, wherein at least one of the joints movably connects two of the links. Optionally, at least one of the joints movably connects one of the links with the base and/or with the probe head. In one embodiment, at least one heating element is provided at each of the plurality of joints.

In one embodiment, the CMM comprises one or more covers, wherein each cover encloses one or more frame elements and is configured to provide passive thermal insulation to reduce thermal exchange between the one or more enclosed frame elements and a surrounding of the machine. For instance, at least one heating element may be at least partly provided inside one of the covers.

According to some embodiments, the temperature control system comprises an air-guiding tunnel enclosed by one or more of the covers, and one or more fans that are configured to guide heated air through the tunnel, e.g. from the one or more heating elements. Optionally, the control unit may be configured to control the fans, e.g. based on the received temperature values.

In one embodiment, the air-guiding tunnel is arranged around at least one of the frame elements. Optionally, if the frame element is a link enclosed by the cover, the air-guiding tunnel can be arranged spiraled around the link.

According to some embodiments of the CMM, each joint comprises a driving unit comprising a motor to actuate the two links connected by the joint relative to one another, and a measuring unit comprising one or more angular sensors to determine at least one angle between the two links connected by the joint. Preferably, the measuring unit and the driving unit are thermally decoupled from each other and/or provided in separate housings.

According to one embodiment of the CMM, the temperature control system is configured to control a temperature of a subset of the frame elements of the structure, the subset comprising at least two frame elements, wherein at least one heating element is provided at each frame element of the subset.

According to another embodiment of the CMM, the temperature control system is configured to control a temperature of each frame element of the structure, wherein at least one heating element is provided at each frame element of the structure.

According to some embodiments, the CMM comprises one or more motors for driving the probe head relative to the base for approaching the measurement point. For instance, the one or more motors are brushless motors. In one embodiment, at least a subset of the heating elements are one or more of the motors.

According to some embodiments, the temperature control system comprises one or more cooling elements and the control unit is configured to control the cooling elements based on the received temperature values.

According to some embodiments, the one or more temperature sensors include at least one of monitoring sensors and thermal-state sensors, wherein monitoring sensors are configured to monitor a temperature of at least one motor of the machine, and wherein thermal-state sensors are configured to generate data on a thermal state of the machine that can be used for a model-based compensation of thermal effects. In particular, each monitoring sensor may be connected to the control unit by an individual set of electric wires, and all thermal-state sensors may be connected to the control unit by the same common set of electric wires.

A second aspect pertains to a computer-implemented method for measuring coordinates, for instance using a CMM according to the first aspect. Said method comprises:
  measuring, using one or more temperature sensors, temperatures at the one or more frame elements;
  generating temperature data based on the measured temperatures and providing the temperature data to a control unit;
  controlling, by the control unit and based on the temperature data, a plurality of heating elements at the one or more frame elements,
  subsequently approaching a plurality of measurement points on an object with the probe head of the coordinate measuring machine by moving one or more frame elements of a structure of the coordinate measuring device; and
  determining coordinates of the measurement points.

The heating elements are controlled in such a way that the temperature of the one or more frame elements remains constant at least while the probe head approaches the plurality of measurement points.

According to some embodiments, the method comprises determining, by the control unit and based on the temperature data, a demand for heating the one or more frame elements, wherein controlling the heating elements is based on the determined demand In one embodiment, one or more ambient temperatures of a surrounding of the coordinate measuring machine are determined, and the demand is determined also based on the one or more ambient temperatures, e.g. wherein determining the one or more ambient temperatures comprises one or more temperature sensors measuring at least one ambient temperature. Preferably, the heating elements are controlled in such a way that a temperature of the one or more frame elements exceeds each of the one or more ambient temperatures.

A third aspect pertains to a computer programme product comprising programme code which is stored on a machine-readable medium, or being embodied by an electromagnetic wave comprising a programme code segment, and having computer-executable instructions for performing the method according to the second aspect.

BRIEF DESCRIPTION OF THE DRAWINGS

Aspects will be described in detail by referring to exemplary embodiments that are accompanied by figures, in which.

DETAILED DESCRIPTION

Figure 1:
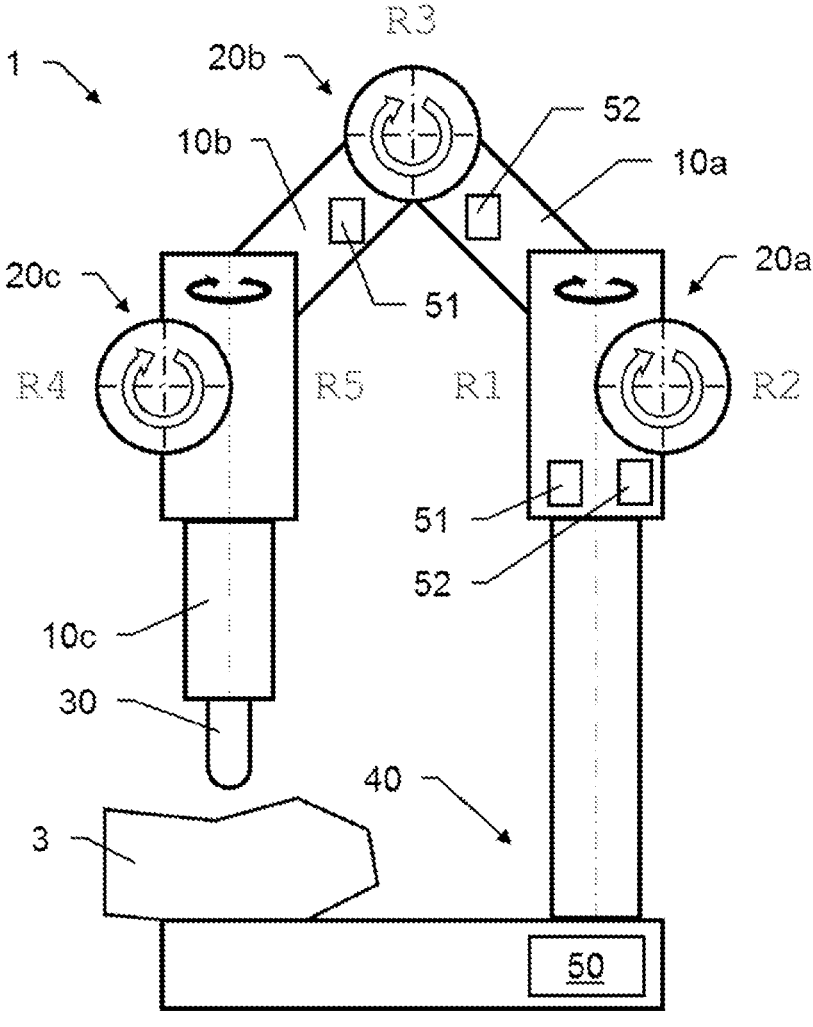
FIG. 1 shows an exemplary embodiment of a CMM.

FIG. 1 shows an exemplary embodiment of a CMM 1. In the shown example, the CMM is embodied as an articulated arm coordinate measuring machine (AACMM) comprising a structure with three links (or arms) 10a, 10b, 10c and three rotary joints 20a, 20b, 20c connecting the links rotatably with each other and with a base 40 of the CMM 1. In the shown example, a first joint 20a provides rotation of a first link 10a relative to the base in two axes of rotation (R1, R2), a second joint 20b provides rotation of a second link 10b relative to the first link 10a in one axis of rotation (R3), and a third joint 20a provides rotation of a third link 10c relative to the second link 10b in two axes of rotation (R4, R5). A probe head 30 is attached to the third link 10c and thus movable relative to the base in three dimensions to approach measurement points on an object 3 to be measured.

, the CMM 1 comprises a temperature control system to actively control a temperature of the CMM, its structure or parts thereof. In the shown embodiment, a control unit 50 of the temperature control system is provided in the base 40 of the CMM 1 and connected via electric wires (not shown) with a plurality of temperature sensors 51 and a plurality of heating elements 52 in the structure. Alternatively, one or more central heating elements may be provided, wherein heated air or fluid is guided to those parts of the CMM the temperature of which is to be controlled. For instance, a central heating element may be provided in or at the base 40. Heated air may then be guided from the central heating element to other parts of the CMM 1 through pipes or hoses that are connected to the links and/or joints or provided inside the links and/or joints or through tunnels inside covers that are provided around the links and/or joints.

Although the CMM 1 shown here is an AACCM, also other kinds of CMMs may be equipped with the temperature control system, including portable and handheld CMMs as well as stationary CMMs, such as portal-, bridge-, cantilever-, or column-type CMMs.

Figure 2:
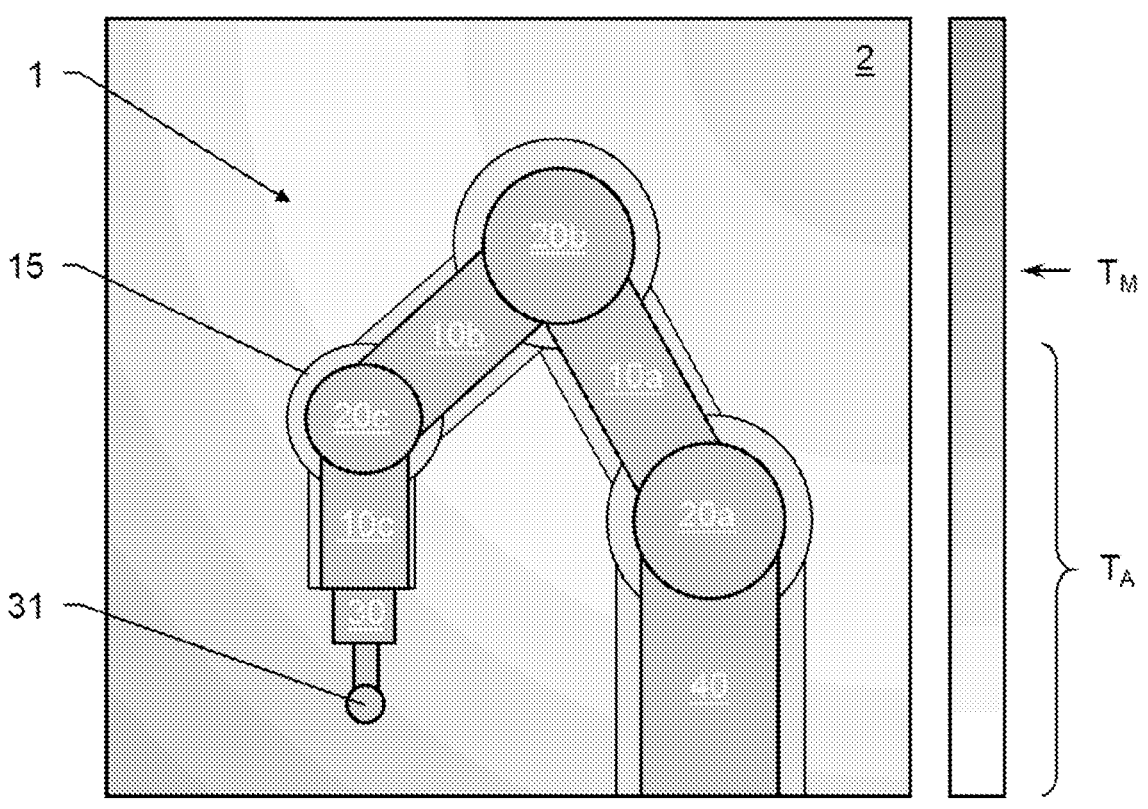
FIG. 2 shows a temperature distribution in an exemplary embodiment of a CMM and its surrounding.

FIG. 2 illustrates a temperature distribution in a CMM 1 being equipped with a built-in active temperature control system (TCS). Darker shades indicate higher temperatures. The CMM 1 is positioned in an environment 2 that is not air conditioned and comprises a variety of ambient temperature values $T_A$ to which the CMM 1 is exposed.

The TCS of the CMM 1 is configured to maintain the machine's temperature $T_M$ constant over a time period $t_1$ that is at least as long a single workpiece measurement (or longer). In the shown example, all components of the CMM 1, i.e. the base 40, the links 10*a-c*, the joints 20*a-c* and the probe head 30 including a touch trigger probe 31 evenly have the temperature $T_M$. However, for some CMMs or processes it may be sufficient to control the temperature only of a subset of these components, for instance only of the links 10*a-c* and the joints 20*a-c*.

$T_M$ is selected to reliably exceed all possible values of ambient temperature $T_A$ during the time period $t_1$. For instance, there may be one permanently fixed value $T_M$ of the maintained temperature that will remain constant during the whole operating life of the machine, and it will be selected to reliably exceed all possible values of ambient temperature at all times and for all machines. For instance, under the assumption that the CMM 1 will not be used in ambient temperatures $T_A$ exceeding 45° C., the value $T_M$ may be selected to be 46° C.

Alternatively, the value $T_M$ may be selected flexibly based on the concrete circumstances, i.e. the actual or assumed ambient temperature $T_A$, which is advantageously for CMMs that are used at different geographical locations with a different local climates or during different seasons, since it may save energy. The TCS may comprise temperature sensors that measure an actual ambient temperature $T_A$. Alternatively, the actual ambient temperature $T_A$ may be retrieved from external sources, e.g. via an Internet connection, or be input by a user of the CMM 1. Alternatively, a position, date and time may be detected by the TCS and an approximate ambient temperature $T_A$ may be assumed therefrom, e.g. automatically retrieved from a look-up table that is stored in a memory of the TCS or accessible by the TCS. Thus, if a temperature is assumed to be in a range of 25° C. to 30° C. at the position and time of the measuring process, $T_M$ may be selected to be e.g. 32° C.

In the shown embodiment, the base 40, the links 10*a-c*, the joints 20*a-c* of the CMM 1 are provided with covers 15 that provide passive thermal insulation to reduce thermal exchange between the enclosed elements and the surrounding.

To further improve the thermal behavior, preferably all structural parts in the measurement chain of the machine (i.e. structural parts of at least all links 10*a-c* and all joints 20*a-c*) have the same or basically the same coefficient of thermal expansion (CTE) along the metrology chain (e.g., all joints have the same axial CTE, whereas the radial CTE is less important). Preferably, the CTE is within +−30% of variation along the structure (+−3 PPM at 10 PPM of absolute CTE value of steel), particularly within +−10%. To achieve the uniform CTE, the same isotropic material may be used for all structural parts. Alternatively, different materials having the same CTE might be used, for instance a stainless steel and a carbon-based composite that is designed to have the same CTE as the used stainless steel.

Figure 3:
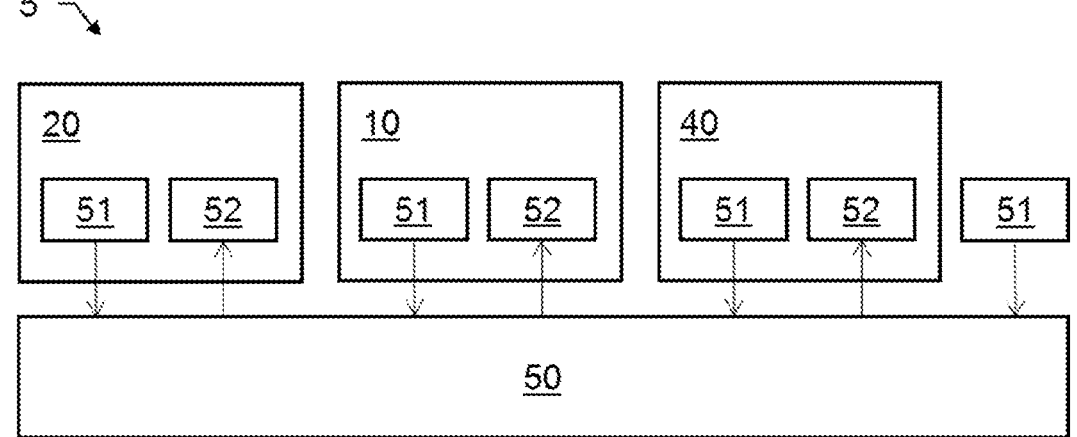
FIG. 3 shows an exemplary embodiment of a temperature control system of a CMM.

FIG. 3 shows an exemplary embodiment of a temperature control system (TCS) 5 for a CMM. The TCS 5 comprises a control unit 50 and several temperature sensors 51 and heating elements 52 that are distributed over several components of a CMM (here: link 10, joint 20 and base 40). For instance, temperature sensors 51 and heating elements 52 may be provided as pairs, e.g. so that at every heating element 52 a temperature sensor 51 is provided. In the shown example, the TGS 5 comprises a further temperature sensor 51 that is not provided in one of the components but arranged outside of the CMM to measure temperatures of the surrounding of the CMM.

The control unit 50 may be comprise data processing and computing capacities, e.g. including a processor and algorithms, and data storing capacities, e.g. a memory for storing a database. The control unit 50 be provided in any part of the CMM, e.g. in the base, or outside of the CMM, e.g. in a remote control of the CMM or other mobile device.

The temperature sensors 51 are configured to measure a temperature, to generate temperature values and to transmit the temperature values to the control unit 50. This may be performed continuously, e.g. as a permanent data stream, or in pre-defined time intervals, e.g. every 5 or 30 seconds.

The sensors may be divided into two distinct groups, i.e. the "fast" sensors and the "slow" sensors. The fast sensors have two functions: control and safety. Fast sensors provide rapid feedback to the control loops of the TCS and monitor the temperature of the machine's motors to detect a possible overheating in a timely manner. The slow sensors are used for metrology. They collect excessive data on the thermal state of the machine (and also on the ambient humidity). This data is used for a model-based compensation of thermal effects that would otherwise decrease the machine's metrological performance.

These two sensor groups may be implemented differently. Preferably, each fast sensor has its own set of electric wires for connection to the control unit 50, while all the slow sensors may share the same set of electric wires (e.g., a so-called 1-wire bus).

The heating elements 52 may be embodied as resistive heaters. They are numerous and are preferably placed at many locations along the measurement chain. This allows achieving "Uniformity by Quantity", i.e. a higher uniformity of the thermal state by introducing a larger quantity of heating elements.

When selecting locations for the heating elements 52, a higher priority may be given to the machine's joints, and a lower priority to its links. This is because the structure of the links normally is simpler than the structure of the joints, and therefore the thermal state of the former is easier to simulate and compensate using software, even if it should be less uniform.

The control unit 50 receives data from all sensors 51 and regulates the thermal power output of all heaters 52 so that the temperature values received from the fast sensors remains as close as possible to the set point $T_M$ and also remains below a preset safety limit. For instance, the thermal safety limit for human touch can be set to around 60° C. and for motor windings to around 100° C.

In embodiments of the CMM that comprise actuators to actively move the probe head relative to the base, often a motor is provided at every joint. All kinds of motors generate heat and the more heat is produced by the motors, the less heat needs to be produced by the heating elements 52. The sensors 51 may be positioned to detect the heat generated by the motors, and/or the control unit 50 may be configured to predict the heat generated by the motors. The control unit 50 may then adapt the heat output of the heating elements 52 accordingly.

Optionally, some or all of these motors can be used both for driving the probe head and as additional heating elements 52 of the temperature control system 5. However, the heat output generally depends on the use of the motor for actuating a joint, so that in many motor types the generated heat cannot be controlled independently. However, some kinds of motors, such as for instance brushless motors, allow for somewhat independent active control of the amount of heat that is generated. Brushless motor winding consists of two sets of coils. The currents that flow through each of them are controlled independently.

Thus, the two projections of the stator's magnetic field (the one projected onto the direction of rotor's magnetic field, and the one projected on the orthogonal direction) can be controlled almost independently. The latter projection creates a mechanical torque, which by definition is the main function of the motor. The former projection creates no torque, but still generates heat. Therefore, the control unit 50 may be configured to actively control —at least to a certain extent—the amount of heat that is generated by this motor, so that it can function as an additional heating element 52. Thus, by using a brushless motor or other suitable motor type, with this motor one heating element would already be provided at every joint, thus advantageously reducing the number of needed dedicated heating elements 52. Optionally, also a transmission and/or a brake may be provided that generate heat.

Optionally, cooling elements may be provided that may be controlled by the control unit similarly to the heating elements in order to enhance control of the temperature, e.g. to reduce a temperature of a certain portion of the CMM faster than only by turning off one or more heating elements. Alternatively or additionally, some or all of the heating elements may be embodied as heating-cooling elements. The cooling elements may comprise active cooling elements, e.g. be embodied as a vapor-compression refrigeration system or as thermoelectric coolers. The cooling elements may also comprise passive cooling elements that do not actively provide cooling but passively by enabling or increasing temperature exchange with the surrounding, e.g. comprising fans that can be activated and/or ventilation slots that can be opened or closed. The cooling elements may be controlled by the control unit 50 based on received temperature data in order to keep the temperature evenly and/or below a pre-defined threshold value, such as preset safety limit.

Figures 4A, 4B:
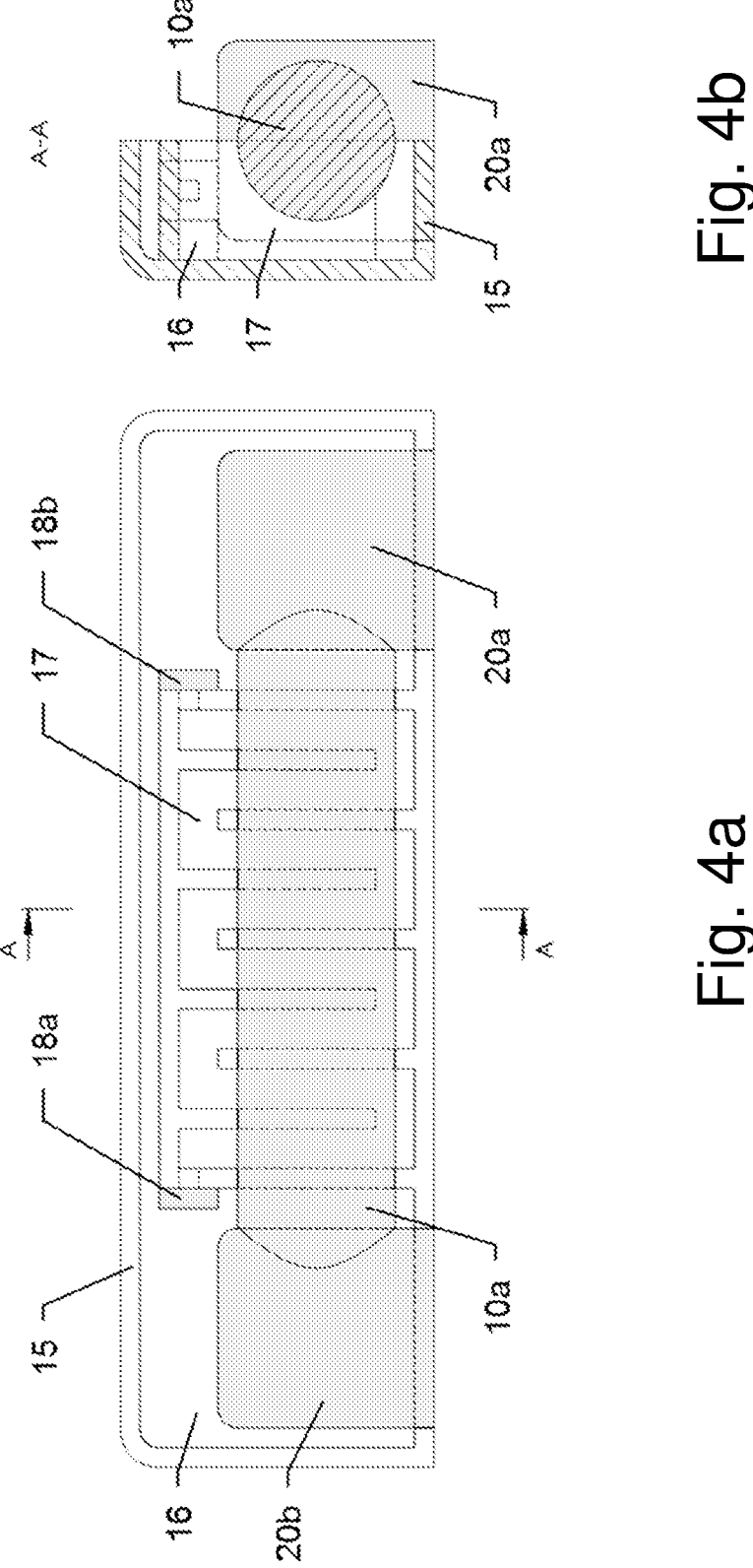
FIGS. 4a-b show a cover enclosing frame elements of an exemplary embodiment of a CMM.

The control unit 50 may be configured to communicate with an on-board computer of the CMM (not shown here), e.g. to issue reports or to receive high-level commands FIGS. 4a and 4b show sectional views of an example of a cover 15 as part of the CMM. For illustrative purposes, only one half of the cover 15 is shown here.

The shown cover 15 encloses a space 16 around a link 10a and two adjacent joints 20a, of the CMM's structure. The cover 15 provides passive thermal insulation to reduce thermal exchange between the enclosed frame elements 10a, 20a, 20b and the surrounding of the CMM. The cover 15 may be made from plastic materials and optionally comprise one or more isolation layers. For instance, the cover 15 may comprise a polyethylene terephthalate (PET) shell having a polyurethane (PUR) foam filling.

One or more heating elements and one or more temperature sensors (not shown here) may be provided inside the space 16 enclosed by the cover 15. In the shown example, an air-guiding tunnel 17 is provided within the space 16, e.g. as an integral part of the cover 15, comprises two fans 18a, 18b and is designed to enhance a thermal exchange between the frame elements 10a, 20a, 20b. As shown in FIG. 4a, the tunnel 17 may be spiraled about the whole length of the link 10a, e.g. enwinding the link 10a. The tunnel 17 has a return path to close the air circulation loop. The fans 18a,b preferably are mounted on the cover and do not touch the frame elements 10a, 20a, 20b to reduce vibrations of the CMM's structure.

The CMM may comprise a multitude of like or similar covers 15 to enclose all structural parts of the CMM. These covers 15 may reduce the thermal exchange between some parts and between some parts and the environment by providing a passive thermal insulation. At the same time, the fans 18 and tunnels 17 included in the covers 15 may increase the thermal exchange between other parts or with the environment by mechanically guiding the air streams.

In some embodiments, the fans 18a,b may be controlled by the same control unit as the heating elements. For instance, the fans 18a,b may be connected in parallel to a single output of the control unit. Alternatively, the fans 18a,b may be controlled separately by an on-board computer of the CMM. Also, they may be connected directly to a constant voltage power source, e.g. to operate at maximal speed all the time.

Alternatively, a fluid may be guided through the tunnels 17, for instance using pumps instead of fans 18a,b.

Preferably, a temperature of the guided air or fluid is pre-conditioned prior to guiding. Temperatures of the enwinded link 10a influence the temperature of the air or fluid guided around it. By continuously measuring the temperatures of the link 10a at a beginning of the tunnel 17, the temperature of the air or fluid can thus be controlled to have the desired temperature at an end of the tunnel. Alternatively or additionally, temperature sensors can be provided in the tunnel to directly measure the temperature of the air or fluid.

Figures 5A, 5B, 6:
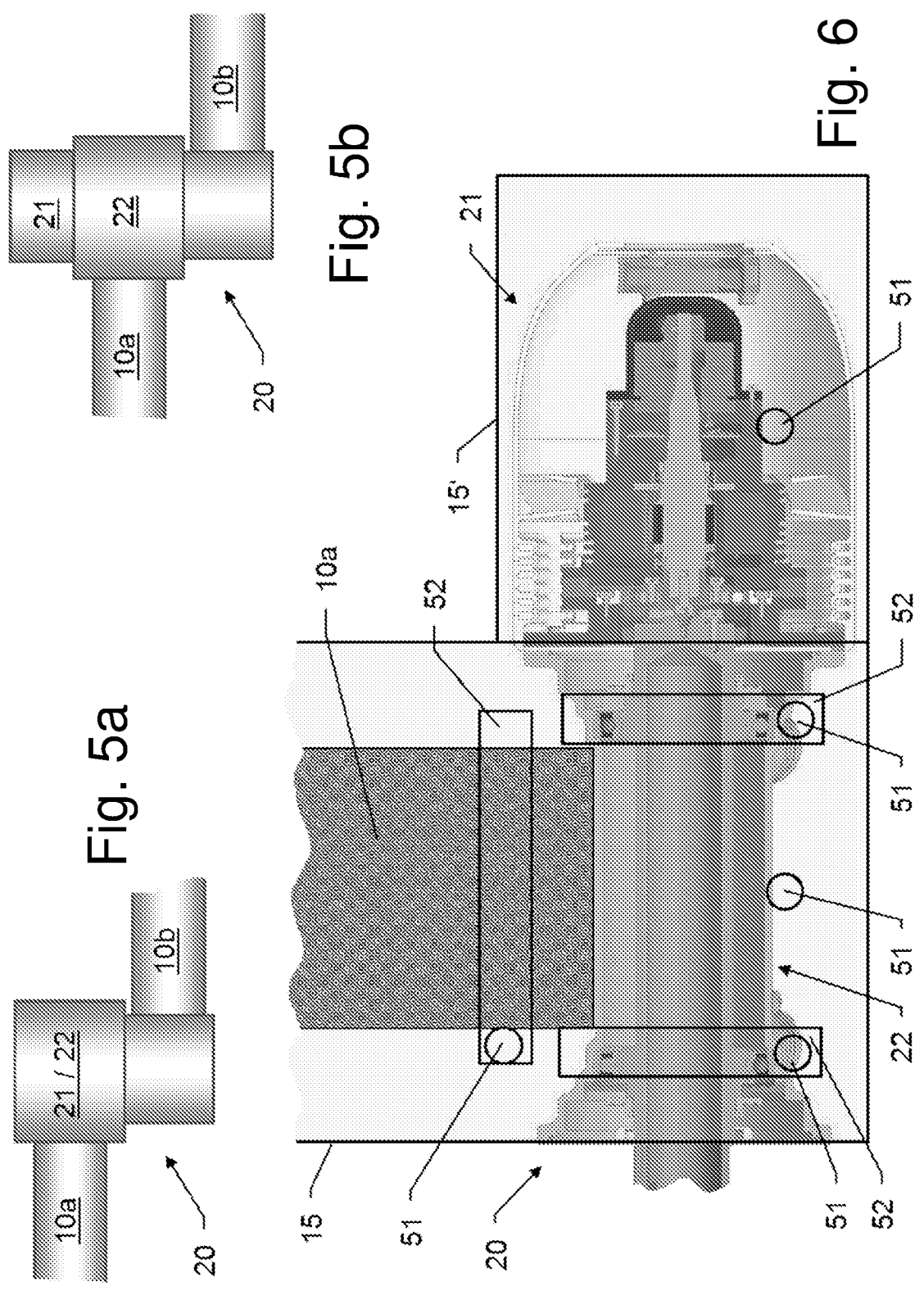
FIGS. 5a-b show two exemplary embodiments of a joint as part of a CMM.
FIG. 6 shows the joint of FIG. 5b with two separate housings.

FIGS. 5a and 5b show two exemplary embodiments of a joint 20 of a CMM. In some embodiments of the CMM, its structure comprises a plurality of links and a plurality of joints as frame elements. As shown here, a joint 20 movably connects two of the links 10a, Additionally (not shown here), one of the joints may movably connect one of the links 10b with a base of the CMM, and another one of the joints may movably connect another one of the links 10a, 10b with a probe head of the CMM. In both embodiments of FIGS. 5a and 5b, the joint 20 comprises a driving unit 21 having a motor to actuate the two links 10a, 10b that are connected by the joint 20 relative to one another. Also, in both embodiments, the joint 20 comprises a measuring unit 22 having one or more angular sensors to determine at least one angle between the two links 10a, 10b.

In the example of FIG. 5a, the measuring unit 21 and the driving unit 22 are provided together, for instance together in a single housing. This allows for a compact setup.

In the example of FIG. 5b, the measuring unit 21 and the driving unit 22 are provided thermally decoupled from each other, for instance in separate housings. This reduces the heat transfer between the two components, particularly from the motor of the driving unit 22 to the sensors of the measuring unit 21 and the structural elements of the joints. At least one heating element may be is provided at the joint 20 to active control the temperature at the joint, particularly at the measuring unit 22.

FIG. 6 shows more details of the embodiment of the joint 20 of FIG. 5b. A measuring unit 22 and a first link 10a attached to it are provided in a common housing 15, whereas the driving unit 22 is provided in a separate housing 15'. Heating elements 52 and temperature sensors 51 as part of a TCS of the CMM are provided at or near the joint 20.

For instance, as shown here, the heating elements 52 may be ring-shaped and attached around the joint 20 and the link 10a. Optionally, in order to improve the control of the heating elements, a temperature sensor may be provided together with each of the heating elements 52, e.g. at, next to or near the heating element 52.

Figure 7:
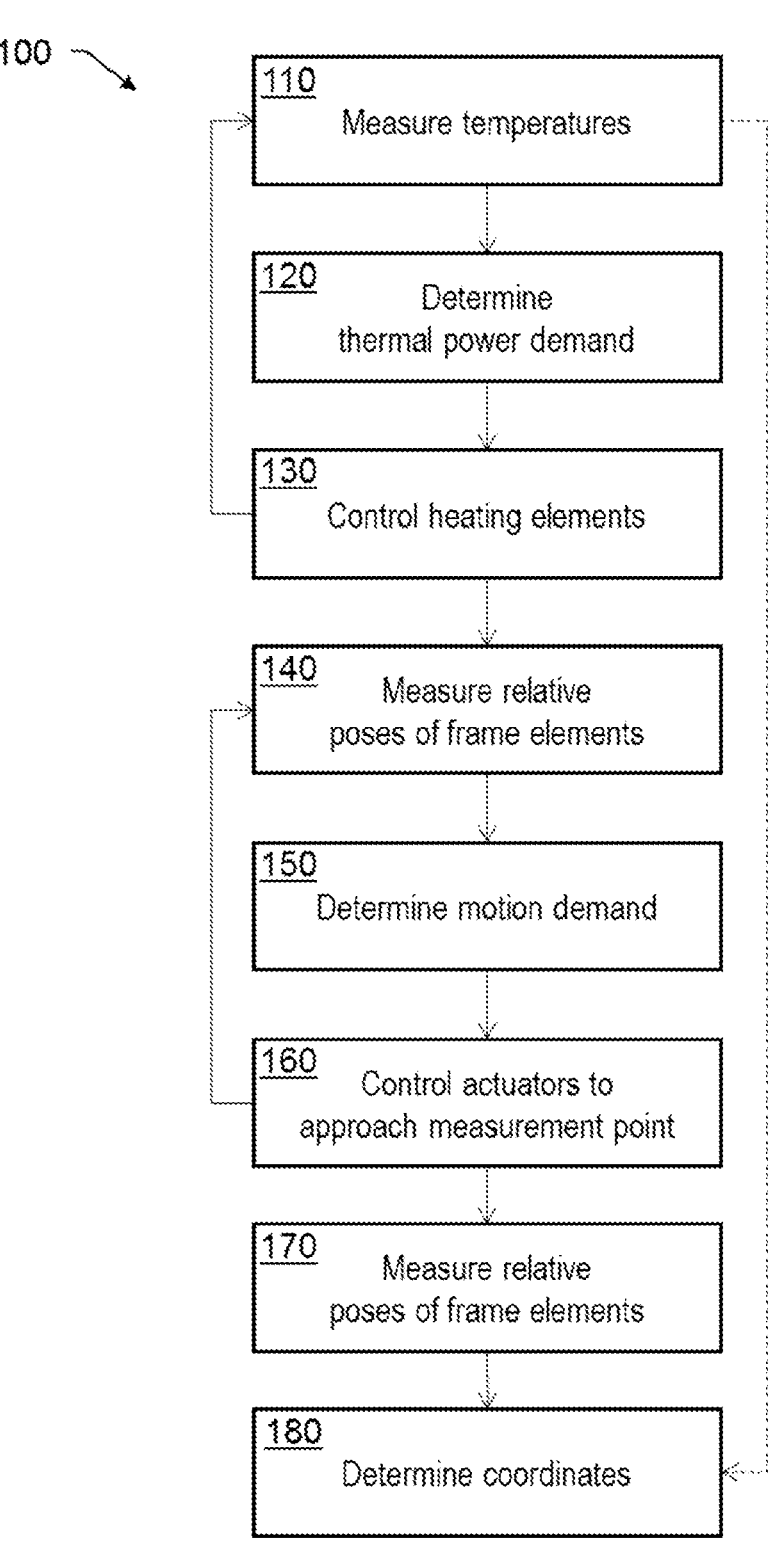
FIG. 7 shows a flow chart illustrating an exemplary embodiment of a method for determining coordinates.

FIG. 7 shows a flow chart illustrating an exemplary computer-implemented method 100 for measuring coordinates. The method comprises measuring 110, using the one or more temperature sensors, actual temperatures at one or more frame elements, generating temperature data based on the measured temperatures and providing the temperature data to the control unit. Based on the temperature data, the control unit determines 120 a demand for thermal power in order to reach a desired, e.g. pre-determined, temperature. Based on the determined demand, the control unit then controls 130 the heating elements to produce heat, so that the desired temperature is reached at the one or more frame elements.

The desired temperature may be selected so that it reliably exceeds all possible values of ambient temperature during the coordinate measurement. For instance, the desired temperature is fixedly set and remains constant during the whole operating life of the CMM. Alternatively, the desired temperature may be selected flexibly based on a measured or assumed ambient temperature. Consequently, the demand for heating may be determined 120 also based on ambient temperatures that are either measured by one or more temperature sensors or determined in other ways, e.g. retrieved from external sources or a user input.

When the desired temperature has been reached, the actual coordinate measurement can be performed, which comprises steps that, per se, are generally known in the art. The coordinate measurement includes an initial measurement 140 of relative poses of the frame elements, e.g. using the measuring units 22 shown in FIGS. 5a,b and 6 to measure angles between links, or more generally, especially in the case of a portal-type CMM, by determining relative positions of the frame members. Measuring 140 the relative poses between adjoining frame elements may comprise measuring a single angle as well as measurements in up to six degrees-of-freedom (6DOF).

The initial pose measurement 140 is then used to determine 150 a motion demand of the frame elements for approaching a measurement point on an object to be measured with a probe head of the CMM. Based on the determined motion demand, the control unit controls 160 actuators of the CMM to move one or more frame elements of the CMM structure so that the probe head approaches the measurement point, e.g. automatically by controlling one or more motors of the CMM. Thereby, steps 140, 150 and 160 may be repeated, e.g. relative poses of the frame elements may be continuously monitored and the motion demand may be continuously updated until the measurement point has been reached.

When the measurement point has been reached, relative poses of the frame elements are measured 170 (e.g. as described with respect the initial measurement 140). A position of the probe head, e.g. relative to a base of the CMM, is deductible from the collective measured relative poses, so that coordinates of the measurement point approached by the probe head can be determined 180. Optionally, the actual temperatures may be used for adapting the coordinates based on known temperature-induced deflections in the frame elements.

To achieve a reliably high measurement precision, the heating elements are controlled 130 preferably in such a way that the temperature of the one or more frame elements remains constant during the whole coordinate measurement, e.g. at least while the probe head approaches the measurement point and until the relative poses of the frame elements have been measured 170. Optionally, the temperature of the one or more frame elements is controlled to remain constant until all measurement points of the object have been approached and probed, so that the coordinates may be determined 180 with high precision.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A coordinate measuring machine for determining at least one spatial coordinate of a measurement point on an object, the coordinate measuring machine comprising a structure comprising a base and a plurality of frame elements, wherein a probe head is attached to one of the frame elements and movable relative to the base, and a temperature control system configured to control a temperature of a plurality of frame elements of the structure and comprising:

a control unit;
one or more temperature sensors; and
one or more heating elements,
wherein
the temperature sensors are configured to generate temperature values and to transmit the temperature values to the control unit;
the coordinate measuring machine comprises one or more covers, at least one heating element being at least partly provided inside the cover;
the temperature control system comprises an air-guiding tunnel enclosed by the cover and one or more fans configured to guide heated air through the tunnel; and
the control unit is configured to receive the temperature values and to control the heating elements and the fans based on the received temperature values.

2. The coordinate measuring machine according to claim 1, wherein the control unit is configured to control the heating elements in such a way that the temperature of a first frame element remains constant, particularly at least over a time period that lasts at least as long as a single measurement of a measurement point by the machine.

3. The coordinate measuring machine according to claim 1, wherein the control unit is configured to control the heating elements in such a way that the temperature of a first frame element exceeds an ambient temperature of a surrounding of the machine, particularly wherein
the control unit is configured to control the heating elements to in such a way that the temperature of the first frame element meets a pre-defined temperature that exceeds the ambient temperature; and/or at least one temperature sensor is configured to measure the ambient temperature.

4. The coordinate measuring machine according to claim 1, wherein each cover encloses at least partially one or more of the frame elements and is configured to provide passive thermal insulation to reduce thermal exchange between the one or more enclosed frame elements and a surrounding of the machine.

5. The coordinate measuring machine according to claim 1, wherein the structure comprises a plurality of links and a plurality of joints as frame elements, wherein at least one of the joints movably connects two of the links, wherein at least one of the joints movably connects one of the links with the base;

at least one of the joints movably connects one of the links with the probe head; and/or at least one heating element is provided at each of the plurality of joints.

6. The coordinate measuring machine according to claim 5, comprising one or more covers, wherein each cover encloses one or more frame elements; and is configured to provide passive thermal insulation to reduce thermal exchange between the one or more enclosed frame elements and a surrounding of the machine, particularly wherein at least one heating element is at least partly provided inside the cover.

7. The coordinate measuring machine according to claim 1, wherein the air-guiding tunnel is arranged around at least one of the frame elements, particularly wherein the frame element is a link enclosed by the cover and the air-guiding tunnel is arranged spiralled around the link.

8. The coordinate measuring machine according to claim 1, wherein each joint comprises a driving unit comprising a motor to actuate the two links connected by the joint relative to one another, and a measuring unit comprising one or more angular sensors to determine at least one angle between the two links connected by the joint, wherein the measuring unit and the driving unit are thermally decoupled from each other and/or are provided in separate housings.

9. The coordinate measuring machine according to claim 1, wherein the temperature control system is configured to control a temperature of a subset of the frame elements of the structure, the subset comprising at least two frame elements, wherein at least one heating element is provided at each frame element of the subset, or to control a temperature of each frame element of the structure, wherein at least one heating element is provided at each frame element of the structure.

10. The coordinate measuring machine according to claim 1, comprising one or more motors for driving the probe head relative to the base for approaching the measurement point, particularly wherein the one or more motors are brushless motors; and/or at least a subset of the heating elements are one or more of the motors; and/or the temperature control system comprises one or more cooling elements and the control unit is configured to control the cooling elements based on the received temperature values.

11. The coordinate measuring machine according claim 9, wherein the one or more temperature sensors include at least one of monitoring sensors and thermal-state sensors, wherein monitoring sensors are configured to monitor a temperature of at least one motor of the machine, particularly wherein each monitoring sensor is connected to the control unit by an individual set of electric wires; and thermal-state sensors are configured to generate data on a thermal state of the machine that can be used for a model-based compensation of thermal effects, particularly wherein all thermal-state sensors are connected to the control unit by the same common set of electric wires.

12. A computer-implemented method for measuring coordinates using a coordinate measuring machine, the method comprising subsequently approaching a plurality of measurement points on an object with a probe head of the coordinate measuring machine by moving one or more frame elements of a structure of the coordinate measuring device;

determining coordinates of the measurement points;

measuring, using one or more temperature sensors, temperatures at the one or more frame elements;

generating temperature data based on the measured temperatures and providing the temperature data to a control unit; and controlling, by the control unit and based on the temperature data, a plurality of heating elements and one or more fans to guide heated air through an air-guiding tunnel enclosed by a cover of the coordinate measuring machine, at least one heating element being at least partly provided inside the cover, wherein the heating elements and the fans are controlled in such a way that the temperature of the one or more frame elements remains constant at least while the probe head approaches the plurality of measurement points.

13. The method according to claim 12, comprising determining, by the control unit and based on the temperature data, a demand for heating the one or more frame elements, wherein controlling the heating elements is based on the determined demand, particularly wherein one or more ambient temperatures of a surrounding of the coordinate measuring machine are determined, and the demand is determined also based on the one or more ambient temperatures, in particular wherein determining the one or more ambient temperatures comprises one or more temperature sensors measuring at least one ambient temperature; and the heating elements are controlled in such a way that a temperature of the one or more frame elements exceeds each of the one or more ambient temperatures.

14. A computer program product comprising programme code which is stored on a non-transitory machine-readable medium, and having computer-executable instructions for performing the method according to claim 12.

15. A coordinate measuring machine for determining at least one spatial coordinate of a measurement point on an object, the coordinate measuring machine comprising a structure comprising a base and a plurality of frame elements, wherein a probe head is attached to one of the frame elements and movable relative to the base, and a temperature control system configured to control a temperature of a plurality of frame elements of the structure and comprising:

a control unit;

one or more temperature sensors; and one or more heating elements, wherein the temperature sensors are configured to generate temperature values and to transmit the temperature values to the control unit; and the control unit is configured:

to receive the temperature values and to determine, based on the temperature values and on one or more ambient temperatures of a surrounding of the coordinate measuring machine, a demand for heating the plurality of frame elements so that a temperature of the plurality of frame elements reaches a pre-defined temperature that exceeds the ambient temperature; and to control the heating elements, based on the received temperature values and on the determined demand, in such a way that the temperature of the plurality of frame elements meets the pre-defined temperature.

\*    \*    \*    \*    \*